US 6,980,891 B2

(12) United States Patent
Nagafuchi et al.

(10) Patent No.: US 6,980,891 B2
(45) Date of Patent: Dec. 27, 2005

(54) POWER PLANT OPERATION CONTROL SYSTEM AND A POWER PLANT MAINTAINING AND MANAGING METHOD

(75) Inventors: Naoyuki Nagafuchi, Tokai (JP); Yasushi Iwai, Hitachi (JP); Hiraku Ikeda, Hitachinaka (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 10/876,562

(22) Filed: Jun. 28, 2004

(65) Prior Publication Data

US 2004/0254684 A1 Dec. 16, 2004

Related U.S. Application Data

(60) Continuation of application No. 10/190,683, filed on Jul. 9, 2002, now Pat. No. 6,772,051, which is a division of application No. 09/791,703, filed on Feb. 26, 2001.

(30) Foreign Application Priority Data

Jun. 22, 2000 (JP) .............................. 2000-192651

(51) Int. Cl.[7] ...................... G05D 11/00; G05B 15/02; G05B 11/01; G21C 17/00

(52) U.S. Cl. ........................... 700/286; 700/9; 700/15; 700/19; 700/21; 700/22; 702/58; 702/184; 715/963

(58) Field of Search ........................... 700/12, 14–17, 700/19, 21, 22, 30, 47, 50, 83, 286, 287, 700/292–298, 9; 702/57–62, 64, 65, 182–185; 715/963–968, 970, 971

(56) References Cited

U.S. PATENT DOCUMENTS

| 4,785,405 A | 11/1988 | Hasegawa et al. |
| 5,107,447 A * | 4/1992 | Ozawa et al. ................. 702/58 |
| 5,132,920 A | 7/1992 | Bellows et al. |

(Continued)

FOREIGN PATENT DOCUMENTS

JP 4-344967 12/1992

(Continued)

OTHER PUBLICATIONS

Kotlica, "On-Line Monitoring of Power Generating Systems", 1998, Power Station Maintenance: Profitability Through Reliability, Conference P Publication No. 452 IEE, p. 35, Fig. 11.

(Continued)

Primary Examiner—Leo Picard
Assistant Examiner—Sean Shechtman
(74) Attorney, Agent, or Firm—Mattingly, Stanger, Malur & Brundidge, P.C.

(57) ABSTRACT

An operation control system for a plurality of power generating plants and a method of maintaining and managing a plurality of power generating plants which supply power to arbitrary power systems. The operation control system includes a general supervision/diagnosis system which maintains and controls a plurality of power generating plants wherein the general supervision/diagnosis system selects from repairing periods and procedures required to repair failures which occur in the plurality of power generating plants according to levels of failures and performs maintenance and management of power generating plants which have failures. The system also includes means for maintaining a stable total power supply of the plurality of power generating plants.

2 Claims, 6 Drawing Sheets

U.S. PATENT DOCUMENTS

| | | | |
|---|---|---|---|
| 5,311,562 A | | 5/1994 | Palusamy et al. |
| 5,329,465 A | * | 7/1994 | Arcella et al. .............. 702/184 |
| 5,550,751 A | | 8/1996 | Russell |
| 5,703,791 A | * | 12/1997 | Amano et al. .............. 700/292 |
| 5,754,033 A | | 5/1998 | Thomson |
| 6,006,171 A | * | 12/1999 | Vines et al. ................ 702/184 |
| 6,490,506 B1 | | 12/2002 | March |
| 6,615,367 B1 | * | 9/2003 | Unkle et al. .................. 714/26 |
| 6,625,520 B1 | | 9/2003 | Chen et al. |
| 2002/0035497 A1 | | 3/2002 | Mazereeuw et al. |
| 2002/0059412 A1 | | 5/2002 | Azpitarte |
| 2002/0087220 A1 | | 7/2002 | Tveit et al. |
| 2002/0192516 A1 | | 12/2002 | Tajima |
| 2003/0004659 A1 | | 1/2003 | Hayashi et al. |
| 2003/0036937 A1 | | 2/2003 | Shahidehpour |

FOREIGN PATENT DOCUMENTS

| | | |
|---|---|---|
| JP | 5-284252 | 10/1993 |
| JP | 7-152984 | 6/1995 |
| JP | 10-301621 | 11/1998 |
| JP | 11-3113 | 1/1999 |

OTHER PUBLICATIONS

Patelli, "Protection, Monitoring and Maintenance of POwer Generators", 1994, Porceedings of the 4th Intl. Conference on Properties and Applications of Dielectric Materials.

Dahal, "Generator Maintenance Scheduling of Electrical Power Systems Using Genetic Algorithms with Integer Representation", 1997, Publication No. 446, IEE.

* cited by examiner

US 6,980,891 B2

POWER PLANT OPERATION CONTROL SYSTEM AND A POWER PLANT MAINTAINING AND MANAGING METHOD

This is a continuation application of U.S. Ser. No. 10/190,683, filed Jul. 9, 2002, now U.S. Pat. No. 6,772,051, which is a divisional application of U.S. Ser. No. 09/791,703, filed Feb. 26, 2001.

BACKGROUND OF THE INVENTION

1. Field of the Invention

The present invention relates to an operation control system and a maintaining and managing method for power generating facilities fit for maintenance/management services of a power network group consisting of a plurality of power supplying facilities.

2. Related Background Art

Technologies on management of power generating facilities have been disclosed in Japanese Non-examined Patent Publications No. 10-301621 (1998), No. 11-3113 (1999), No. 7-152984 (1995), and No. 5-284252 (1993).

However, these technologies are all related to processing in the inside of a power generating facility such as instructions of operations, provision of work information, and so on and do not include centralized control and management of a plurality of power generating facilities.

Real time diagnoses of a plurality of power generating facilities such as facility failure diagnosis, supervision for failure symptoms, facility diagnosis by evaluation of performance using a database have been requested between said power generating facilities and an operation control system.

SUMMARY OF THE INVENTION

An object of the present invention is to provide an operation control system and a maintaining and managing method for power generating facilities fit for maintenance/management services of a power network group consisting of a plurality of power supplying facilities.

The present invention is characterized by an operation control system for controlling a plurality of power generating facilities, comprising means for gradually weighting the levels of failures of said power generating facilities according to operating status information of each of said power generating facilities and means for outputting preset information corresponding to each weighted failure level.

Or the present invention is characterized by a method of maintaining and managing a plurality of power supplying facilities which supply power to arbitrary power systems, comprising a step of selecting a repairing period and procedure for a failure which occurred in at least one of said power supplying facilities from repairing periods and procedures which are predetermined according to levels of failures.

DETAILED DESCRIPTION OF PREFERRED EMBODIMENTS

Figure 1:
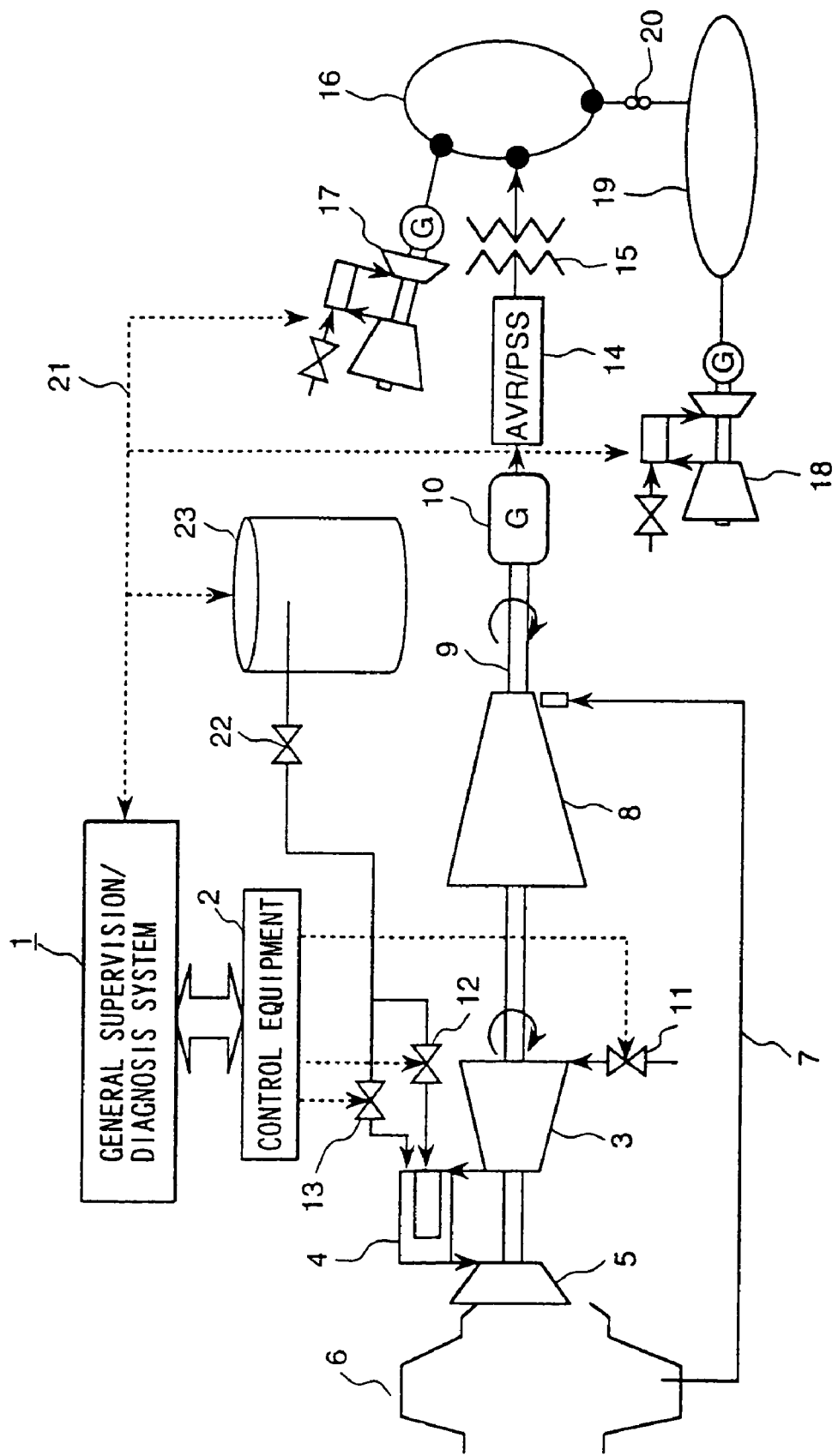
FIG. 1 shows a power generation facility network to which the present invention is applied.

FIG. 1 shows a power supplying system comprising a plurality of power generating facilities which include a distributed power supply group which is an embodiment of the present invention. Below will be explained the present invention using the application to an arbitrary gas turbine combined power generating facility as an example.

Referring to FIG. 1, the system comprises a general supervision/diagnosis system 1 for managing a power supply system and a piece of control equipment 2 which supplies process quality information of a selected power generating facility to the diagnosing system 1.

One of the power generating facilities is linked to a power system through a power regulator which regulates the voltage and power fluctuation of power generated by a generator 10 and a transformer 15 which regulates power from the power regulator 14 into a voltage for the power system 16.

One of said power generating facilities consists of a compressor 3 which compresses air, a compressor inlet guide vane 11 which regulates the rate of an air flow fed to the compressor 3, a fuel source regulating valve 22 which regulates the rate of a fuel source sent from a fuel base 23, a diffusion fuel regulating valve 12 and a pre-mixed fuel regulating valve 13 which regulate the flow rates of fuel from the fuel source regulating valve 22 for diffusion and pre-mixing, a burner 4 which mixes and burns fuel sent from the diffusion fuel regulating valve 12 and the pre-mixed fuel regulating valve 13 and a compressed air from the compressor 3 and generates high-temperature combustion gas, a turbine 5 which recovers power from the combustion gas fed from the burner 4, a heat exchanging boiler 6 which recovers heat from the exhaust gas output from the turbine 5 and generates superheated steam, a steam pipe 7 which transfers superheated steam from the heat exchanging boiler 6 to a steam turbine 8, and a rotary shaft 9 which transfers a turning effort of the compressor 3, the turbine 5, and the steam turbine 8 to the generator 10.

Further, this system comprises another power generating facility 17 which is linked to the power system 16 in the same power network, a non-utility power generator or IPP facility 18 which is a distributed power supply, a distributed power supply system 19 which is a local network connecting a power generating facility 18, a circuit breaker 20 which makes or breaks the connection between the power system 16 and the distributed power supply system 19, and a leased or satellite communication line 21 which transfers control signals from the general supervision/diagnosis system 1 to the fuel base 23, another power generating facility 17, a distributed power facility 18, and so on. Here, the leased or satellite communication line 21 used as a telecommunication means in this embodiment can be substituted by another communication means such as Internet.

In the normal operation status of this system, the general supervision/diagnosis system 1 usually monitors process quantities sent from said control equipment 2 and provides the operation manager with daily management information required for operation, information about remaining service lives of expendables, etc.

When a failure occurs in this system, the general supervision/diagnosis system 1 provides the operation manager with the level of the failure and information about possible causes of the failure. If the operation manager requires, this system secures the power quality of said power system 16 and provides information on operations to protect the power generating facility which has the failure.

Further, if a fatal failure which damages a power generating facility occurs, this system provides information required to shorten the repairing period and minimizes the operating time of the power generating facility which has the failure.

Below will be explained functions to materialize the above operations.

Figure 2:
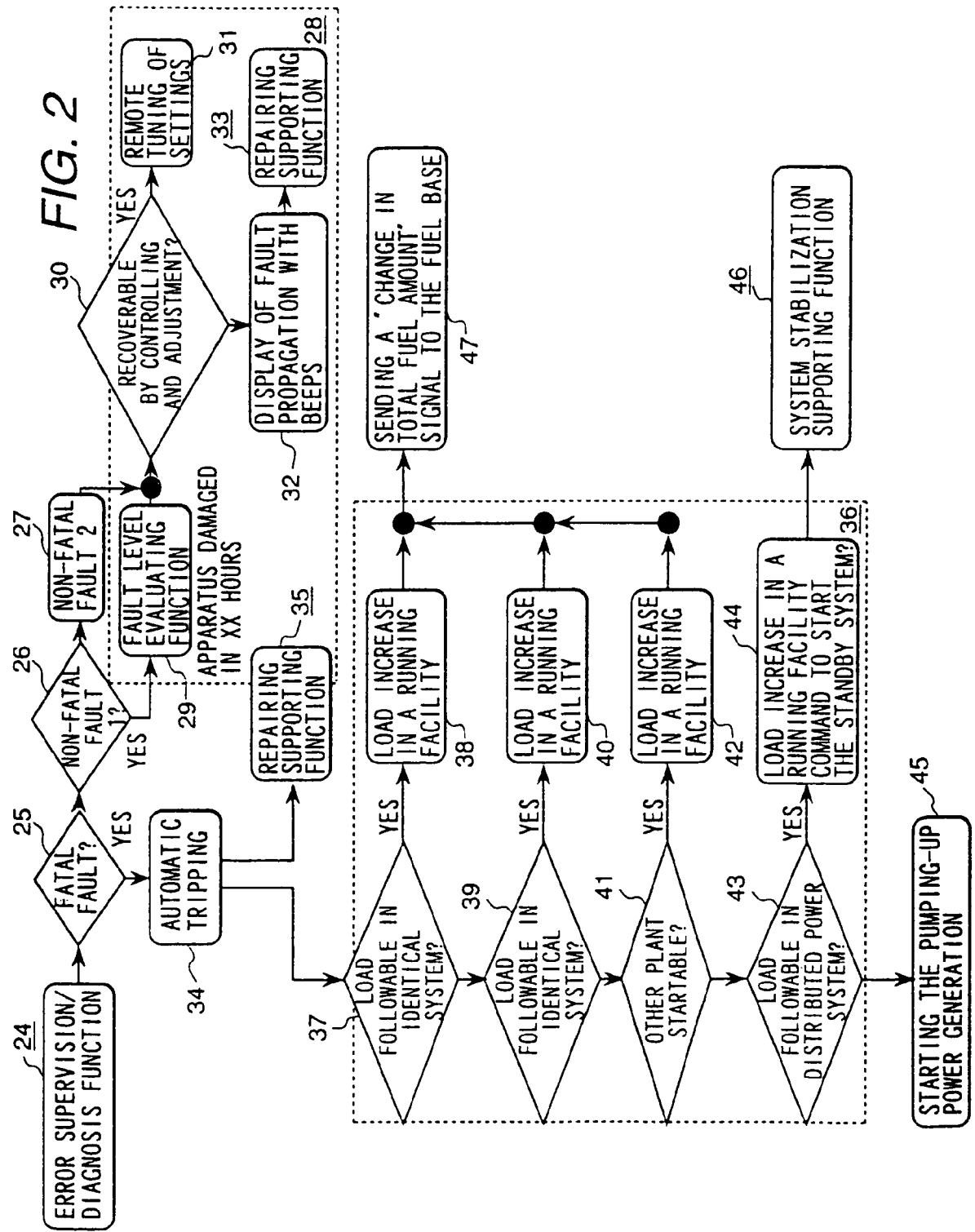
FIG. 2 is an explanatory illustration of a general supervision/diagnosis system which is an embodiment of the present invention.

FIG. 2 shows the content of the general supervision/diagnosis system 1 of FIG. 1. The general supervision/diagnosis system 1 is equipped with an error supervision/diagnosis function 24 which receives process supervision information and operation instruction information from the control equipment 2 and diagnoses the operating status of target power generating facilities and failure level judges 25 which determine the level of the failure according to information sent from the error supervision/diagnosis function 24.

This embodiment transfers operating status information from respective power generating facilities to the error supervision/diagnosis function 24 by a communication means. For easier judgment of fault levels (or failure levels), information on operating status and secular characteristic changes of apparatus or information from operators of selected power generating facilities are used as the operating status information from respective power generating facilities. The failure level judges receive information from the error supervision/diagnosis function 24 and give stepwise weights to failures according to the degrees of failures in the power generating facilities. For example, the description of this embodiment assumes there are three failure levels: Fatal fault, Non-fatal fault 1, and Non-fatal fault 2. These weights are given according to time periods and procedures required for repairing or correction. A repairing period and a repairing procedure are assigned to each failure (fault) in advance.

In details, the fault level judge 25 judges whether the failure is fatal or non-fatal. A failure which does not require stopping of a power generating system is judged to be non-fatal.

When the fault level judge 25 judges it as a non-fatal failure, the fault level judge 26 judges whether the failure is non-fatal fault 1 or non-fatal fault 2. A failure which may cause device damages when left unrepaired is judged to be non-fatal fault 1. A failure which may cause no device damage when left unrepaired is judged to be non-fatal fault 2. Failure information judged to be non-fatal fault 2 is sent to the fault level judge 27.

This embodiment comprises a status forecasting function 28 which forecasts the status of the power generating facility from information sent from the fault level judges 26 and 27.

When the fault level judge 25 judges that the failure is a fatal fault which requires stopping of the power generating facility, the fault level judge 25 sends the failure information to the optimum scheduling supporting function 36. This embodiment is constituted so that information may be transferred from this optimum scheduling supporting function 36 to the pumping-up power facility control function 45, the system stabilization supporting function 46, the fuel base control function 47, and so on.

The status forecasting function 28 processes information as explained below. The information judged to be non-fatal fault 1 is evaluated by the fault level evaluating function 29 whether the failure may propagate into an apparatus damage. The fault level evaluating function 29 sends the information to the recoverability evaluator 30.

Similarly, the information judged to be non-fatal fault 2 is sent to the recoverability evaluator 30.

The recoverability evaluator 30 checks whether the status can be recovered by adjustment of control value settings, that is by changing control values. If it is possible, the information is sent to the control value adjusting function 31. The function 31 performs remote tuning of control value settings and the like and adjusts the control quantities. If it is not possible, information is sent from the recoverability evaluator 30 to the fault propagation evaluating function 32.

The fault propagation evaluating function 32 is so constituted to display information about occurrence of a failure and forecasted result of propagation of the failure, to send the information to the repairing supporting function 33, and to provide the operation manager with information about failure causes, repairing procedures, etc.

When a fatal failure which requires stopping of a facility occurs in a power generating facility, this embodiment can immediately inform to the power generating facility or stop the operation of the power generating facility.

The optimum scheduling supporting function 36 processes information as follows. When the information is judged to be fatal by the fault level judge 25, the automatic plant stopping function 34 stops the power generating facility which has the failure and automatically stops. In this case, the automatic plant stopping function 34 can send process quantities to the repairing supporting function 35 and provide the operation manager with information about failure causes, repairing procedures, etc. When a fatal failure which requires stopping of a facility occurs in a power generating facility, this embodiment can immediately inform to the power generating facility or stop the operation of the power generating facility.

At almost the same time, information to stop the power generating facility is sent from said automatic plant stopping function 34 to the optimum scheduling supporting function 36.

The optimum scheduling supporting function 36 checks, by the operating status judge (in the identical system) 37, whether the other power generating facility in the system which contains the power generating facility which has stopped can take over the load of the faulty power generating facility. If the load can be taken over by the other power generating facility, the operation control function (in the identical system) 38 increases the load of a running power generating facility which does not have a failure and approximately at the same time, sends a "Change in Total Fuel Amount" signal for the fuel base 23 to said fuel base control function 47. Thus, if at least one of said power supplying facilities (power generating facilities) fails, it is possible to assure the steady power supply of the whole power system comprising a plurality of power generating facilities by selecting a repairing period and procedure for the failure from repairing period periods and procedures which are determined according to levels of failures and by controlling the operation of at least one of power supplying facilities except the faulty power supplying facility. It is also possible to control the power supplying facilities in the other power system, the power supplying facility in the stop status, or the distributed power source facilities.

If the operating status judge (in identical system) 37 judges that the load cannot be taken over by the other power generating facility, the information is sent to the operating status judge (in other power generating facility) 39 which judges whether the load of the faulty power generating facility can be taken over by a power generating facility in the other system. When the load can be taken over by a power generating facility in the other system, the operation control function (in other system) 40 increases the load of a running power generating facility and at the same time, sends a "Change in Total Fuel Amount" signal for the fuel base 23 to said fuel base control function 47.

If the operating status judge (in other power generating facility) 39 judges that the load cannot be taken over by any power generating facility in the other system, the information is sent to the operating status judge (in other power generating facility) 41 which judges whether a power generating facility in the stop status can be started immediately. If the power generating facility in the stop status can be started immediately, the information is sent to the operation control function (other power generating facility) 42 and the power generating facility in the stop status is started. Approximately at the same time, the "Change in Total Fuel Amount" signal for the fuel base 23 is sent to said fuel base control function 47

If the operating status judge (in other power generating facility) 41 judges that there is no power generating facility which can be started immediately, the information is sent to the operation status judge (decentralized power supply) 43 which judges whether the load can be taken over by a running or stopping distributed power source facility. If the load can be taken over by a distributed power source facility, the information is sent to the operation control function (distributed power supply) 44. The operation control function 44 increases the load of the running distributed power source facility or starts a stopping distributed power source facility. Approximately at the same time, the "Change in Total Fuel Amount" signal for the fuel base 23 is sent to said fuel base control function 47.

Information generated by said operation control functions 38, 40, 42, and 44 are sent to said system stabilization supporting function 46.

If the operation status judge (distributed power supply) 43 judges that there is no power generating facility which can be started immediately, the information is sent to the operation control function (pumping-up power station) 45 and the load is taken by a pumping-up power generation.

As explained above, as failures of the power generating facilities are respectively given stepwise weights according to the operating status information of each power generating facility in the system, we can exactly grasp the level of a failure which occurred in one power generating facility and its location. Therefore, operations of a plurality of power generating facilities can be managed collectively, concentrating facilities and increasing the efficiency of management jobs. Particularly, this embodiment is suitable for collectively controlling power generating facilities which are remotely dispersed.

Further, this embodiment is equipped with means for outputting preset information for each weighted failure level. So a proper repairing action can be taken for a power generating facility which has a failure. Therefore, for quick repairing, it is preferential to send said repairing information to the section in charge of the operation of the power generating facility or the operation supporting section and to dispatch service engineers to the facility. Further, as the repairing period and procedure fit for the failure can be obtained just by selection, quick and exact maintenance services can be done on the power supplying facility which has a failure.

Figure 3:
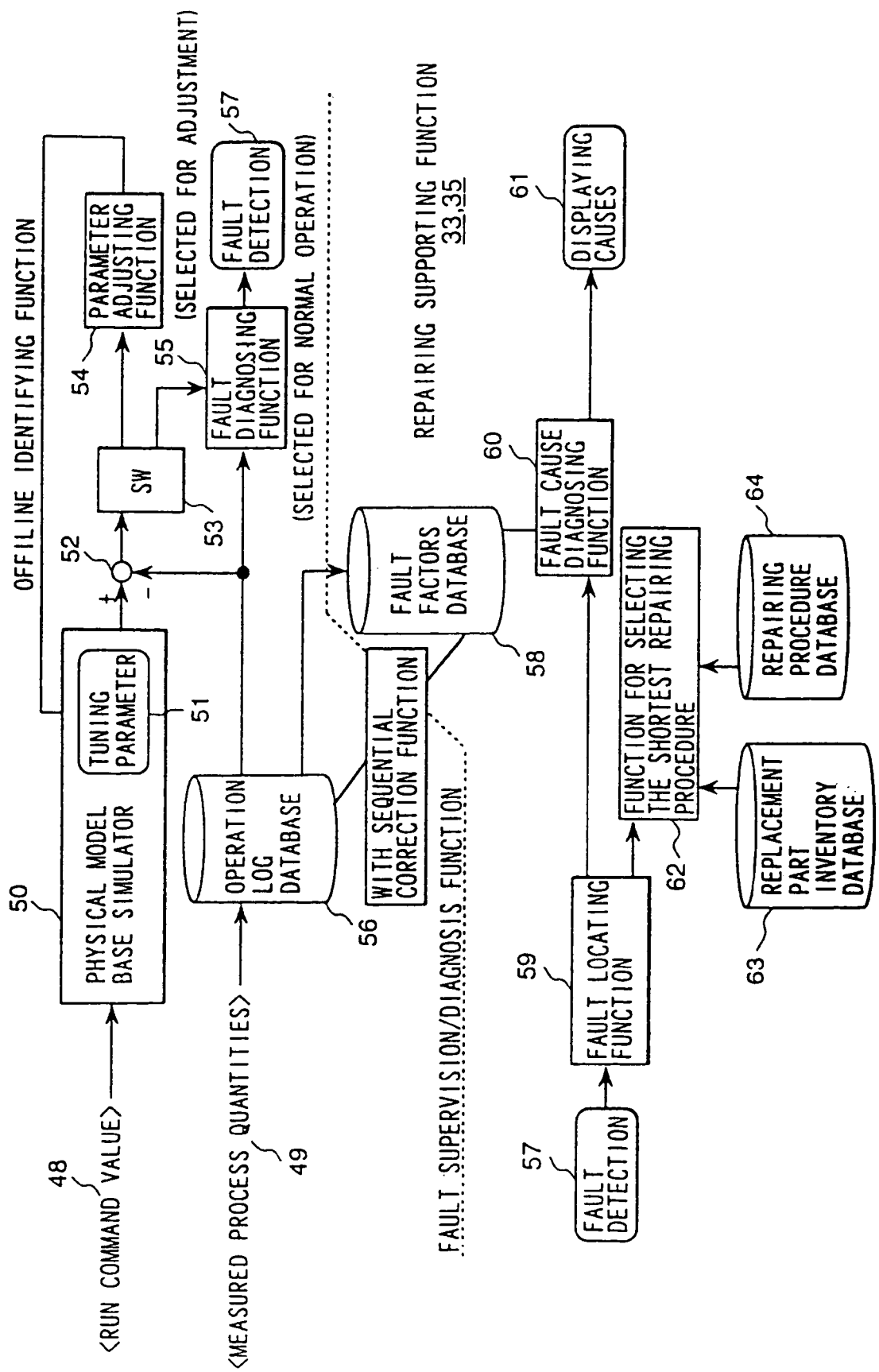
FIG. 3 is an explanatory illustration of a general supervision/diagnosis system and a repairing supporting function.

Referring FIG. 3, below will be explained the details of the error supervision/diagnosis function 24 and said repairing supporting functions 33 and 35 in FIG. 2. FIG. 3 shows the functional block diagram of said error supervision/diagnosis function 24 and said repairing supporting functions 33 and 35.

The error supervision/diagnosis function 24 performs as explained below. The error supervision/diagnosis function 24 receives a run command signal 48 from the control equipment 2 and sends to the physical model simulator 50 which contains a set of tuning parameters 51 to eliminate a difference between the result of computation and the result of actual operation.

The physical model simulator 50 calculates normal-operation process quantities which are expected when a facility is operated by said run command signal 48 and outputs the result to the subtractor 52.

The process quantity measurement signal 49 sent from the control equipment 2 is sent to the operation log database 56 which has a function to correct and update the normal/abnormal operation data by results of daily operations.

The operation log database 56 sends the information of measurement in the current operation status to said subtractor 52. The subtractor 52 sends the resulting difference information to the switch 53.

The switch 53 sends the difference information to the fault diagnosing function 55 while the operation is normal or to the parameter adjusting function 54 when the difference between the result of computation and the result of actual operation exceeds a preset limit even in the normal operation. If the output of the subtractor 52 exceeds a preset limit, the switch sends the signal to the fault diagnosing function 55. The fault diagnosing function 55 compares the information from said switch 53 by data (normal operation data and abnormal operation data) from the operation log database 56 and checks whether the operation is normal or abnormal. When assuming there may be a failure, the fault diagnosing function 55 outputs a Fault Detected signal 57.

When the switch 53 switches to send a signal from said subtractot 52 to said parameter adjusting function 54, the function 54 outputs a signal which adjusts said tuning parameters 51 so that the difference between the result of computation by said simulator 50 and the normal operation data sent from said operation log database may be zero. An offline identifying function is provided so that said parameter adjustment may be carried out while the plant is not in operation for safety. In this way, this embodiment can perform fault supervision and diagnosis efficiently and accurately.

The repairing supporting functions 33 and 35 perform as explained below. When a plant has a failure, the fault locating function 59 locates a faulty part from the Fault Detected signal 57 and sends the resulting information to the fault cause diagnosing function 60 and to the function 62 for selecting the shortest repairing procedure.

The fault cause diagnosing function 60 selects the most possible failure cause information from the fault factors database 58 which classifies the failure information from the operation log database by locations and causes for management and outputs cause display information 61.

The function 62 for selecting the shortest repairing procedure selects and outputs information of parts and procedures required to repair the failure in a very short time period from the replacement part inventory database 63 having information of the inventory of replacement parts and the repairing procedure database 64 having repairing procedures that were actually carried out. This enables easy, accurate, and quick repairing of a faulty power generating facility.

Figure 4:
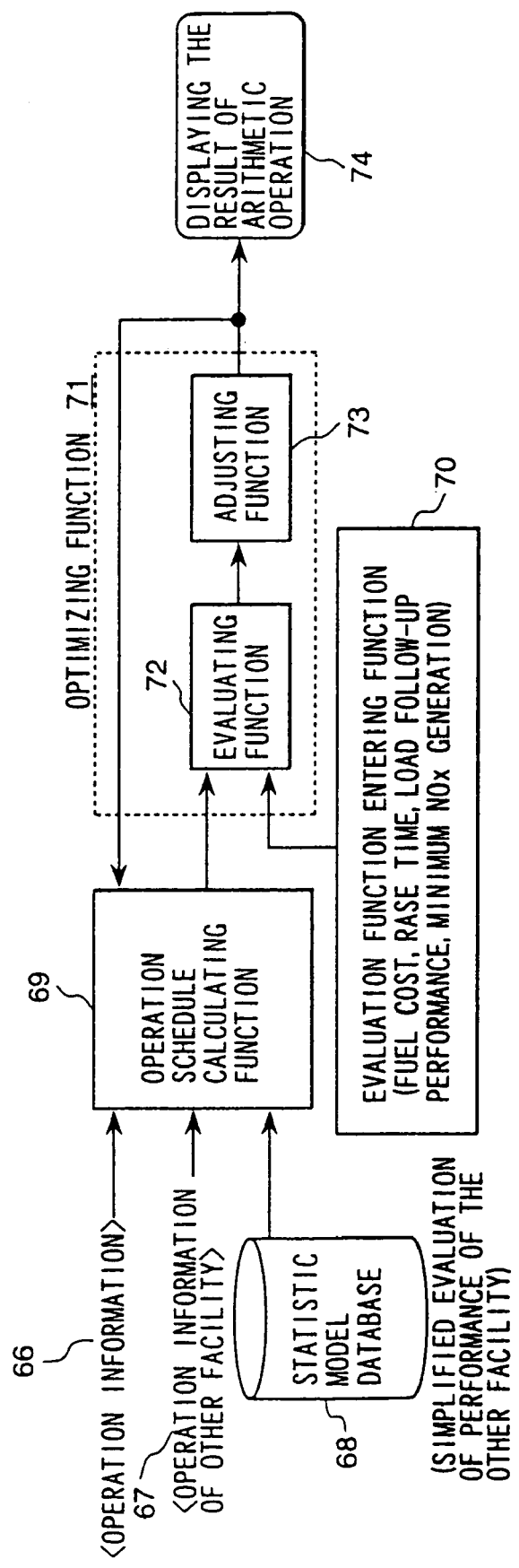
FIG. 4 is an explanatory illustration of an optimum scheduling supporting function and a system stabilization supporting function
Figure 5:
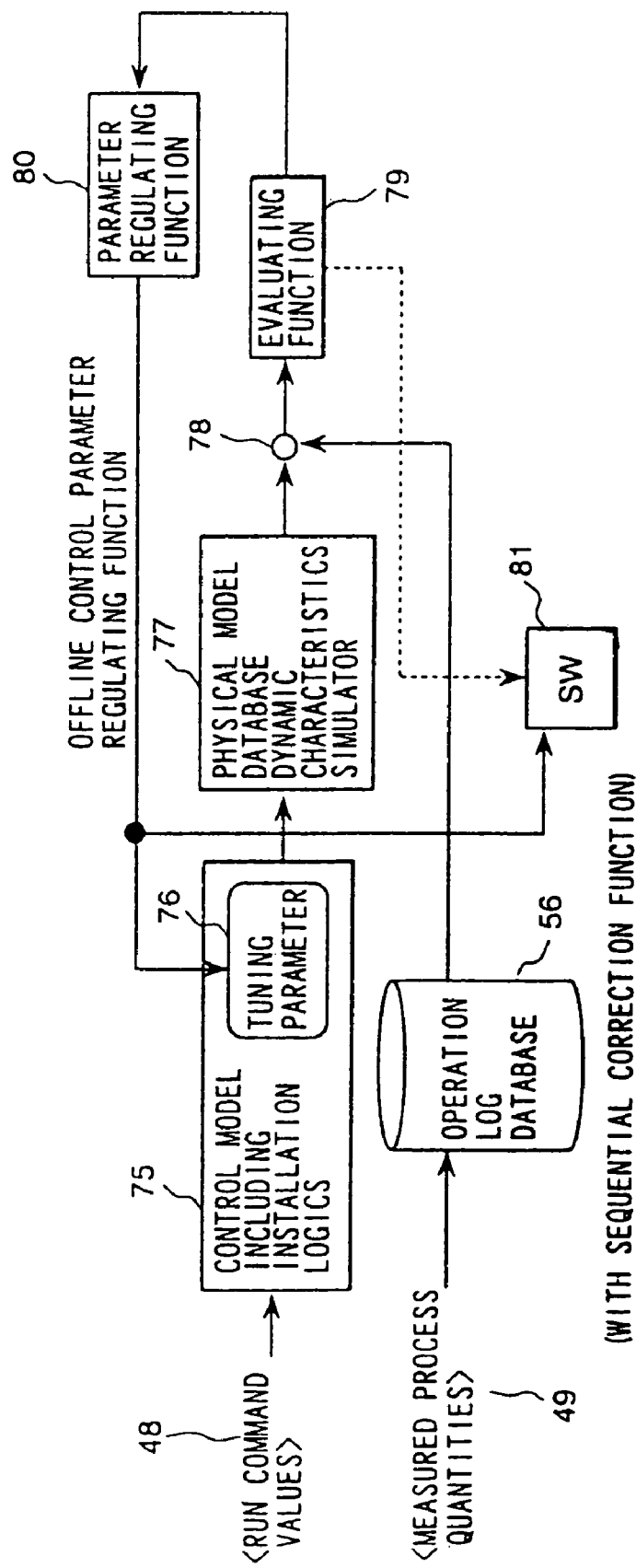
FIG. 5 is an explanatory illustration of a status forecasting function.

Next will be explained the optimum scheduling supporting function 36 and the system stabilization supporting function 46, referring to FIG. 4

Operation information 66 from the control equipment 2, other facility operation information 67 sent from other power generating facilities 17 and 18 in FIG. 1 through information transfer means 21, and information coming from the statistic model database 68 which simulates the operation characteristics of the other power generating facilities 17 and 18 are fed to the operation schedule calculating function 69. The operation schedule calculating function 69 calculates the operation schedules of the target power generating facilities and sends the result to the optimizing function 71.

The optimizing function 71 includes an evaluating function 72 and an adjusting function 73. The evaluating function 72 checks whether the entered information satisfies conditions by functions that the operation manager selects by the optimization evaluating function selecting function 70 and sends the result (information of judgment) to the adjusting function 73. The adjusting function 73 feeds back a signal for re-scheduling or partial modification so that the result of operation by the operation schedule calculating function 69 may be optimum. The signal which is evaluated to be optimum by the evaluating function 72 is output to a display unit 74 which displays the result of arithmetic operations. In this way, the operation schedule can be optimized.

Next will be explained the status forecasting function 28. The run command signal 48 from the control equipment 2 is sent to a control system model 75 which contains an installation logic of the control equipment 2.

The control system model 75 contains a set of tuning parameters 76 to eliminate a difference between the result of computation and the result of measurement of actual control operation ends. The control system model 75 calculates a control operation end instruction signal which is expected when the facility is operated according to the operation instruction signal 48 and sends the result to the physical model base dynamic characteristics simulator 77.

The physical model base dynamic characteristics simulator 77 calculates the process status quantity from the control signal and outputs the result to the subtractor 78.

The process quantity measurement signal 49 sent from the control equipment 2 is sent to the subtractor 78 through the operation log database 56. The resulting difference information is sent to the evaluating function 79.

The evaluating function 79 sends a switching signal to the switch 81 and a signal to modify preset control values for control of said control operation ends to the parameter regulating function 80.

The parameter regulating function 80 outputs a signal to adjust tuning parameters 76 so that the subtractor 78 outputs 0. This signal is fed to the switch 81 and fed back as a signal for tuning the control setting by a switching signal sent from the evaluating function 79 when a failure occurs. An offline identifying function is provided so that said parameter adjustment may be carried out while the plant is not in operation for safety. In this way, this embodiment can forecast the status efficiently and accurately.

Figure 6:
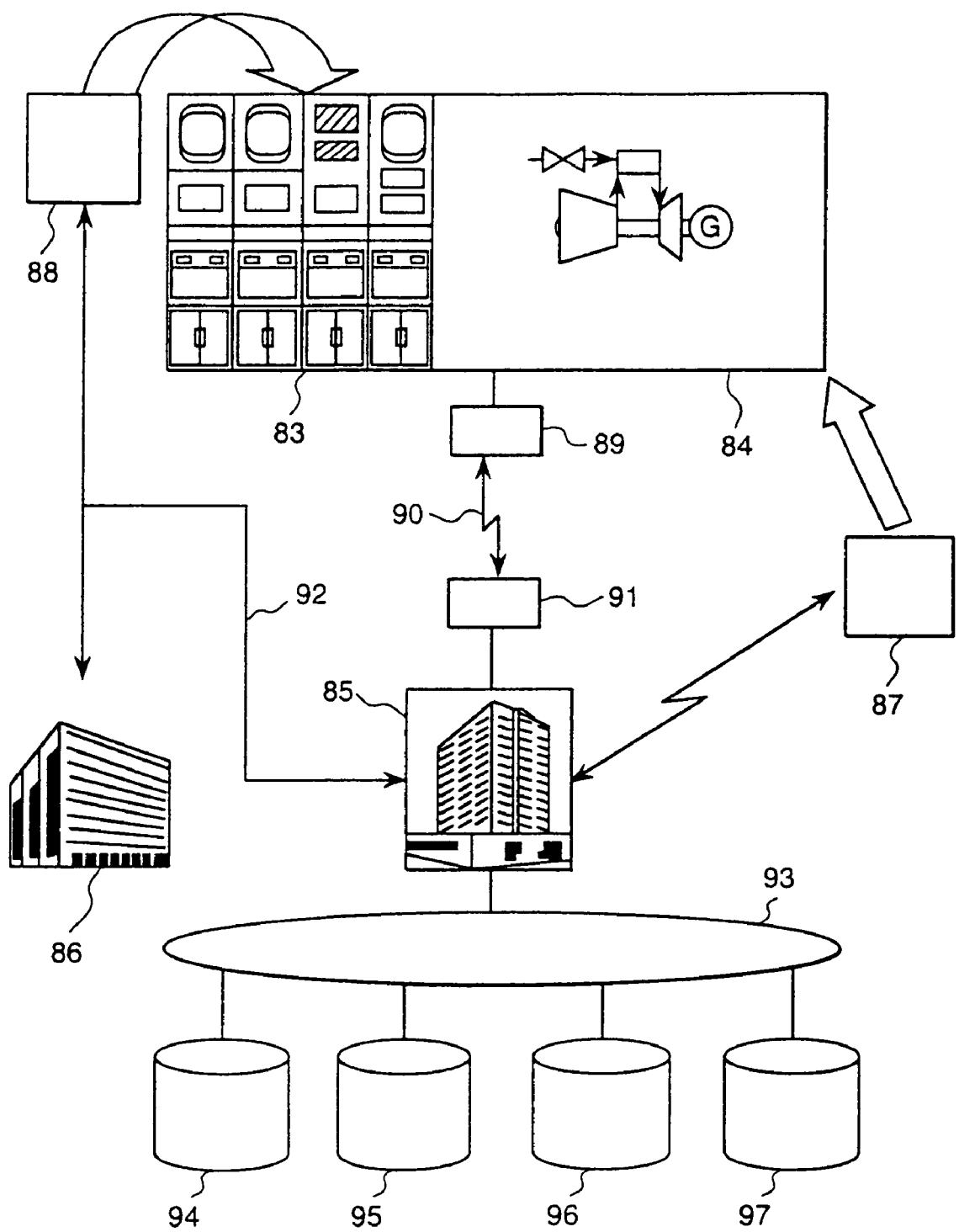
FIG. 6 is a schematic diagram of a power generation plant management system which shows a positional embodiment of the operating method of the present invention.

Below will be explained a method of operating a plant to which the present invention is applied, referring to FIG. 6.

Information from a power generation control panel 83 which controls and monitors the operating status of a power generation plant is coded and transmitted to the general control center 85 which contains functions explained in FIG. 1 to FIG. 5 through a communication line 90 which is a communication means. The coded information can protect the power generation control equipment 83 and the general control center 85 from violating interference from the outside.

The communication line 90 has a firewall function 89 and 91 to protect the system against violating accesses on each end of the line. The coded information can protect the power generation control equipment 83 and the general control center 85 from violating interference from the outside.

Further, the general control center 85 has an intranet 93 for communication which connects a database of apparatus drawing and specification data 94, a database of performance and life cycle evaluation diagnosis data 95, a database of auxiliary parts data, and a database of common data 97 for designing and manufacturing sections so that the engineers in the general control center 85 may share the data. In other words, the engineers can use apparatus drawing and specification data 94, performance and life cycle evaluation diagnosis data 95, auxiliary parts data 96, and common data 97 for designing and manufacturing sections through the general control center 85. This provides an excellent facility maintenance/management service.

Operators and maintenance engineers 88 of the power generation plant 84, the general control center 85, and the service shop 86 which manages replacement parts are interconnected directly communication lines 92. This provides an excellent facility maintenance/management service.

For example, when the power generation plant 84 has a failure, the power generation control panel 83 or the operator or maintenance engineer 88 of the plant 84 sends information to the general control center 85.

The general control center 85 sends plant recovery information obtained by functions in FIG. 1 to FIG. 5 to said power generation control panel 83, to said operators and maintenance engineers 88, and to repairing instructors 87 who are dispatched upon request from said general control center 85. Said information is also sent to the service shop 86.

In this way, this embodiment can monitor a plurality of remote power generation facilities and provide information for operators to control the operating status of the facilities if the facility has a possibility of failure. Further when one of the facilities fails, this embodiment can immediately support recovery of the facility. The security function when added to the communication means can prevent external interference by third parties.

This embodiment is very effective for a power supplying system comprising a plurality of power generating facilities linked to a power system and distributed power source facilities such as non-utility power generator, IPP, and fuel cells.

The present invention can provide an operation control system and a maintaining and managing method for power generating facilities fit for maintenance/management services of a power network group consisting of a plurality of power supplying facilities.

What is claimed is:

1. An operation control system for a plurality of power generating plants comprising a general supervision/diagnosis system which maintains and controls a plurality of power generating plants, wherein said general supervision/diagnosis system diagnoses failures in said plurality of power generating plants and selects from repairing periods and procedures required to repair failures which occur in any of said plurality of power generating plants according to levels of failures and said general supervision/diagnosis system performs maintenance and management of any of said plurality of power generating plants which have failures; and means for maintaining a stable total power supply of said plurality of power generating plants.

2. A method of maintaining and managing a plurality of power generating plants which supply power to arbitrary power systems, comprising the steps of;

diagnosing and obtaining failure information of said plurality of power generating plants from an error supervision/diagnosis means to determine any of said plurality of power generating plants which have a failure, determining a level of each said failure by a fault level judge, and showing a predetermined repairing period and procedure for each said failure according to the determined fault level, and maintaining a stable total power supply of said plurality of power generating plants.

* * * * *